United States Patent
Wolf

(10) Patent No.: US 10,040,493 B2
(45) Date of Patent: Aug. 7, 2018

(54) REAR-END DIFFUSER ARRANGEMENT FOR A MOTOR VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/277,368

(22) Filed: Sep. 27, 2016

(65) Prior Publication Data

US 2017/0113741 A1    Apr. 27, 2017

(30) Foreign Application Priority Data

Oct. 23, 2015   (DE) .................. 10 2015 118 076

(51) Int. Cl.
*B62D 35/02* (2006.01)
*B62D 37/02* (2006.01)
*F15D 1/00* (2006.01)

(52) U.S. Cl.
CPC ............ *B62D 35/02* (2013.01); *F15D 1/007* (2013.01); *B62D 37/02* (2013.01)

(58) Field of Classification Search
CPC ....... B62D 35/007; B62D 35/02; B62D 37/02
USPC .............................. 296/180.1, 180.3, 180.5
See application file for complete search history.

(56) References Cited

U.S. PATENT DOCUMENTS

| | | | |
|---|---|---|---|
| 9,257,535 B2 * | 2/2016 | Lee ................... | H01L 29/78696 |
| 2014/0070564 A1 * | 3/2014 | Bernard ............... | B62D 35/005 |
| | | | 296/180.3 |
| 2015/0232138 A1 * | 8/2015 | Parry-Williams ...... | B62D 35/02 |
| | | | 296/180.5 |
| 2015/0353148 A1 | 12/2015 | Wolf | |
| 2017/0050684 A1 * | 2/2017 | Kim ..................... | B62D 35/007 |

FOREIGN PATENT DOCUMENTS

DE        102013101296 A1 *  8/2014  ............. B62D 37/02
DE     10 2013 105 842            12/2014

OTHER PUBLICATIONS

English translation of DE 10 2013 101 296; retrieved Oct. 25, 2017 via PatentTranslate located at www.epo.org. (Year: 2017).*

* cited by examiner

*Primary Examiner* — Jason S Daniels
(74) *Attorney, Agent, or Firm* — Gerald E. Hespos; Michael J. Porco; Matthew T. Hespos

(57) ABSTRACT

A rear-end diffuser arrangement for a motor vehicle has at least one flap (16, 18; 32) mounted on a body part (10) of the motor vehicle (2) so as to be movable by at least one drive device (38). The flap (16, 18; 32) is movable from a retracted state into a deployed state and vice versa. The at least one flap (16, 18; 32) has a concavely curved surface facing toward the vehicle rear end (20).

5 Claims, 3 Drawing Sheets

REAR-END DIFFUSER ARRANGEMENT FOR A MOTOR VEHICLE

CROSS REFERENCE TO RELATED APPLICATION

This application claims priority under 35 USC 119 to German Patent Appl. No. 10 2015 118 076.6 filed on Oct. 23, 2015, the entire disclosure of which is incorporated herein by reference.

BACKGROUND

1. Field of the Invention

The invention relates to a rear-end diffuser arrangement for a motor vehicle, having at least one flap mounted on a body part of the motor vehicle so as to be movable by way of at least one drive device, in such a way that the flap is movable from a retracted state into a deployed state and vice versa.

2. Description of the Related Art

Diffuser arrangements are well known from the prior art. They form active surfaces in the underbody region of a motor vehicle to improve aerodynamics. For example, a rear-end diffuser arrangement can significantly improve road grip, particularly during lateral acceleration maneuvers. More detailed explanations regarding the manner in which a rear-end diffuser operates is provided in the teachings of Newton and Bernoulli, which are available on the Internet.

DE 10 2013 105 842 A1 discloses a rear-end diffuser arrangement that is integrated in the underbody region of the motor vehicle and has a fixed diffuser part and of a movable diffuser part in the form of a flap. The flap is in the form of a straight areal element. The rear-end diffuser arrangement disclosed in DE 10 2013 105 842 A1 is highly cumbersome with regard to installation and integration in the underbody region. Use of the rear-end diffuser arrangement of DE 10 2013 105 842 A1 also is restricted for design-related reasons.

It is therefore an object of the invention to provide a rear-end diffuser arrangement that avoids the above-mentioned disadvantages.

SUMMARY

The invention relates to a rear-end diffuser arrangement with at least one flap that has a concavely curved surface facing toward the vehicle rear end. Thus, the flap and the rear-end diffuser arrangement can be integrated into the rear-end region itself. The flap may be part of an overhang angle of the motor vehicle. The structural space situation is more easily manageable in the rear-end region than in the underbody region. As a result, the rear-end diffuser arrangement offers greater flexibility with regard to accommodating the drive device. Also, for physical reasons, the surface that is curved toward the motor vehicle ensures a horizontal flow-off of air and improves the aerodynamic characteristics.

The rear-end arrangement may have at least one bumper element, and the flap may be mounted movably in the rear-end arrangement by way of bearings. The flap may have a separation edge on a flange directed toward the roadway. In this way, the deployment angle of the flap can be reduced greatly as compared to a flap that has no downwardly directed separation edge, thereby leading to a greater ground clearance.

The rear-end diffuser arrangement may be formed over part of the width, or even the entire width, of the rear end. The embodiment that runs over the entire width of the rear end may be implemented, for example, in vehicles without exhaust-gas tailpipes, such as electric vehicles.

Two or more flaps can be provided, thereby further increasing the flexibility of the rear-end diffuser arrangement with regard to fitting and design. At least one frame part for the flap may be provided in the rear-end arrangement. The frame part may have at least one cut out for at least one exhaust tailpipe. The rear-end diffuser arrangement may be adapted to the position at which the one or more exhaust tailpipes are to be provided by selecting a suitable number of flaps.

DETAILED DESCRIPTION

Figure 1:
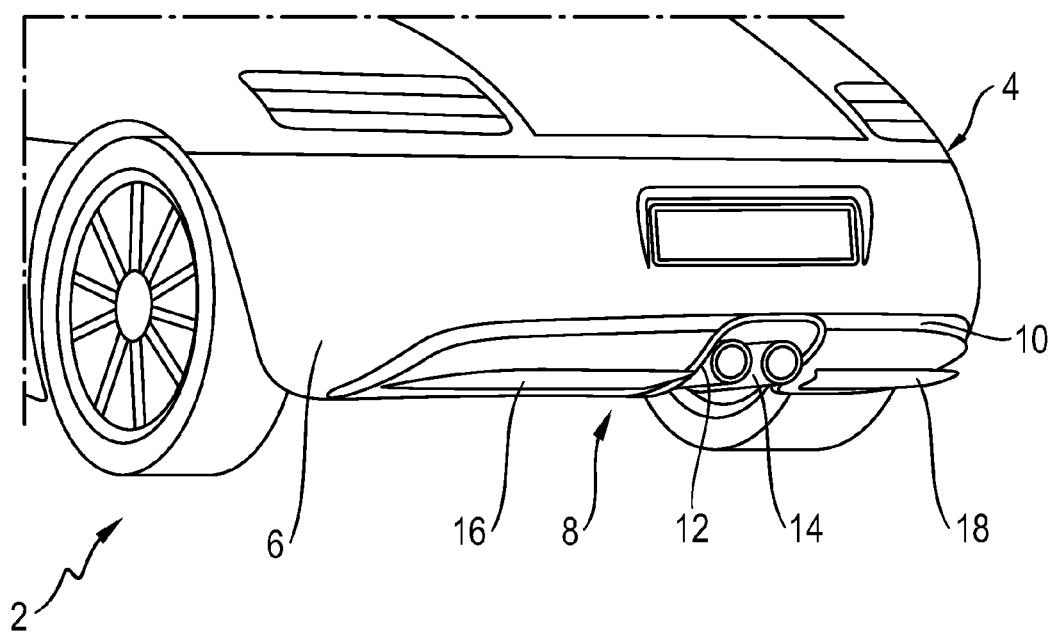
FIG. 1 is a perspective rear view of a motor vehicle having a rear-end diffuser arrangement according to the invention.

FIG. 1 illustrates a motor vehicle 2 having a rear-end arrangement 4 with a bumper element 6 and a rear-end diffuser arrangement 8. The rear-end diffuser arrangement 8 has a frame part 10 with a cutout 12 for a twin exhaust tailpipe 14 and two flaps 16, 18 are mounted movably on the frame part 10.

Figure 2:
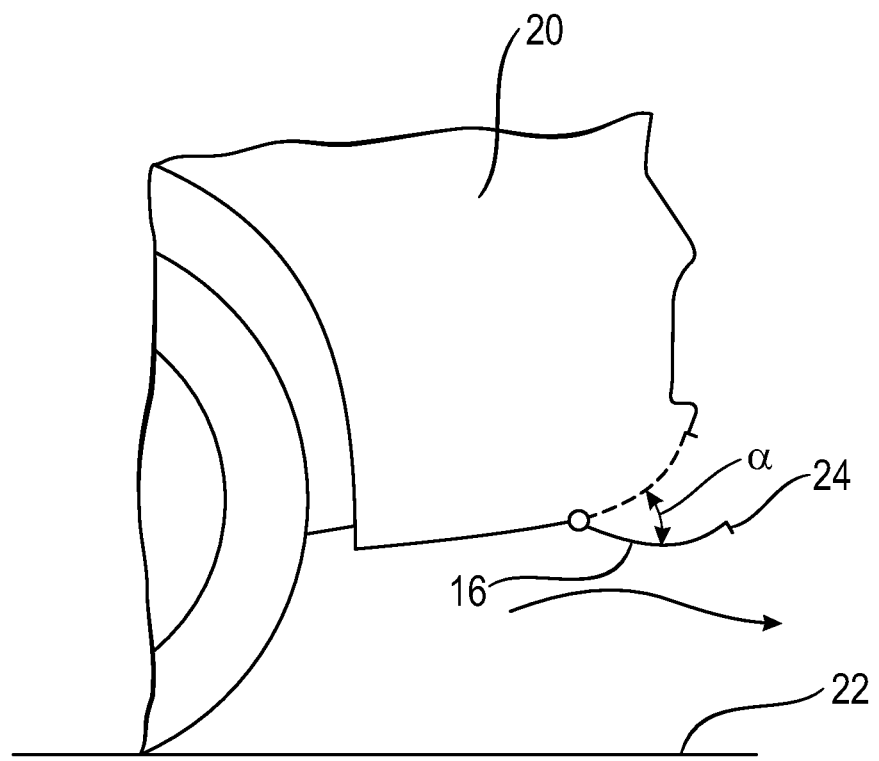
FIG. 2 is a schematic side view of a rear-end diffuser arrangement according to the invention arranged in an SUV motor vehicle.

As can be clearly seen from a schematic view in FIG. 2, the flaps 16, 18 have a concavely curved surface that faces toward the lower rear end 20 of the motor vehicle 2 and that nests with the lower rear end when the flaps are in the retracted state. The convexly curved outer or lower and rearward facing surface of each flap conforms to the outer profile shape of the lower rear end 20 of the motor vehicle 2 when the flaps 16, 18 are in the retracted state, and in this retracted state, the curved surface yields an adequate overhang angle, and thus the necessary ground clearance. In the deployed state, the flaps 16, 18 ensure a virtually horizontal deflection of the air so that the downforce decreases and the air resistance falls. In the present exemplary embodiment, the flap 16 and 18 have a flange with a separation edge 24 that is directed toward the roadway 22 and achieves a much smaller deployment angle α of the flap 16 than an embodiment without a separation edge 24.

Figure 3:
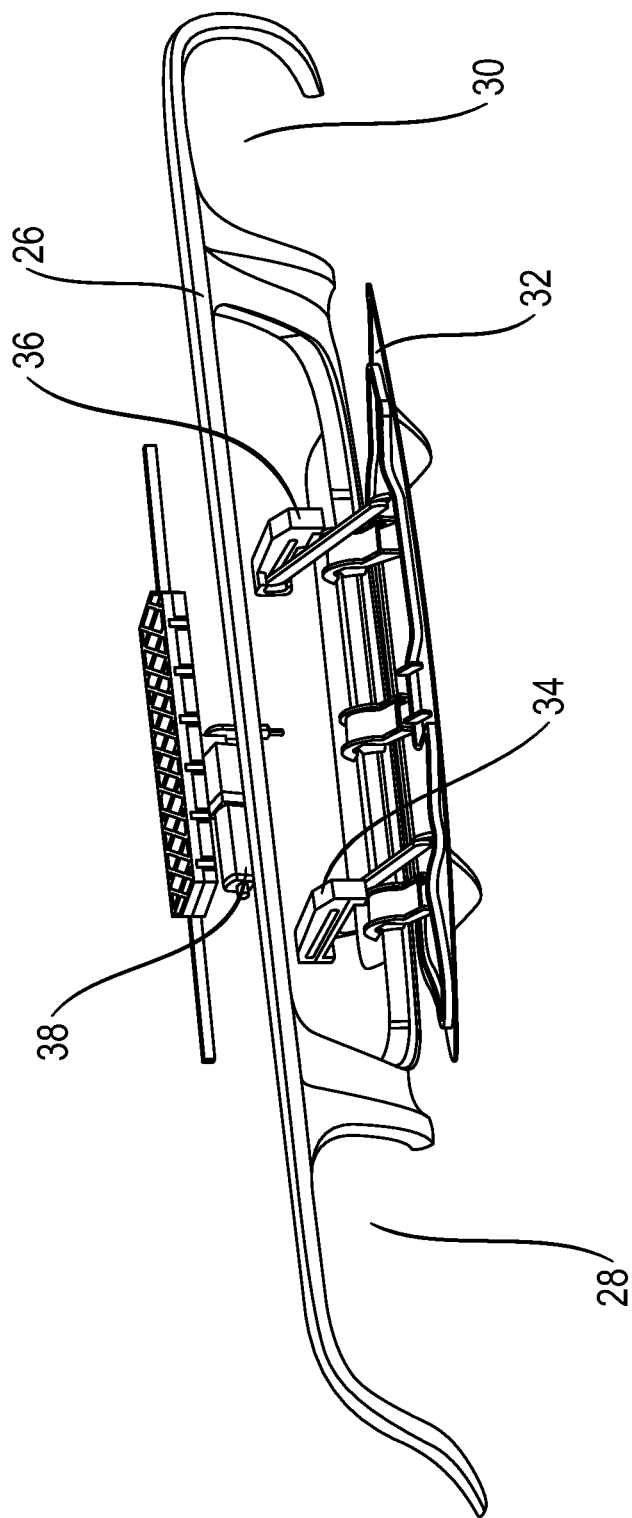
FIG. 3 is a perspective detail view of a rear-end diffuser arrangement according to the invention provided for integration in a rear-end arrangement.

FIG. 3 now shows a frame part 26 that is modified in relation to FIG. 1. The frame part 26 has two cutouts 28, 30 for exhaust tailpipes (not illustrated in any more detail). Furthermore, in the frame part 26, only one flap 32 is mounted movably by way of bearing means 34, 36. The flap 32 is transferred from a retracted state into the deployed state, which is illustrated in FIG. 3, and vice versa in a known manner by way of a drive device 38.

It should be clear that the embodiment of the drive device 38 and of the bearing means 34, 36 can also apply to the embodiment of FIG. 1.

What is claimed is:

1. A rear-end diffuser arrangement for a rear end of a motor vehicle, the rear-end diffuser arrangement comprising: at least one flap mounted on a body part of the motor vehicle, the at least one flap having opposite front and rear ends, a concavely curved upper surface that faces toward a lower part of the rear end of the vehicle and a convexly curved lower surface that faces away from the vehicle, the front end of the at least one flap being connected pivotally to the vehicle, at least one drive device mounted between the vehicle and the flap and being operative to pivot the flap from a retracted state into a deployed state and vice versa, and a separation flange projecting from the rear end of the at least one flap and being directed toward the roadway when the flap is in the deployed state, the at least one flap being configured so that a distance from the roadway to at least parts of the convex surface of the at least one flap are less than a distance from the roadway to the separation flange.

2. The rear-end diffuser arrangement of claim 1, wherein the motor vehicle has a rear-end arrangement with at least one bumper element, and the at least one flap being mounted movably in the rear-end arrangement by way of bearings.

3. The rear-end diffuser arrangement of claim 1, wherein the at least one flap comprises two or more flaps.

4. The rear-end diffuser arrangement of claim 3, further comprising a frame part that has at least one cutout for at least one exhaust tailpipe, the at least one flap being offset laterally from the at least one cutout sufficiently to permit passage of the at least one exhaust tailpipe from the at least cutout.

5. The rear-end diffuser arrangement of claim 1, wherein the front and rear ends of the at least one flap are substantially equally spaced from the roadway when the at least one flap is in the deployed state.

\* \* \* \* \*